July 25, 1961  G. S. LOZIER  2,993,946
PRIMARY CELLS
Filed Sept. 27, 1957  8 Sheets-Sheet 1

INVENTOR.
GERALD S. LOZIER
BY
ATTORNEY

INVENTOR.
GERALD S. LOZIER
BY
ATTORNEY

July 25, 1961 G. S. LOZIER 2,993,946
PRIMARY CELLS
Filed Sept. 27, 1957 8 Sheets-Sheet 4

INVENTOR.
GERALD S. LOZIER
BY
ATTORNEY

INVENTOR.
GERALD S. LOZIER
BY
ATTORNEY

INVENTOR.
GERALD S. LOZIER
BY
ATTORNEY

July 25, 1961 G. S. LOZIER 2,993,946
PRIMARY CELLS
Filed Sept. 27, 1957 8 Sheets-Sheet 7

INVENTOR.
GERALD S. LOZIER
BY
ATTORNEY

United States Patent Office 2,993,946
Patented July 25, 1961

2,993,946
PRIMARY CELLS
Gerald S. Lozier, Lawrence Township, Mercer County, N. J., assignor to Radio Corporation of America, a corporation of Delaware
Filed Sept. 27, 1957, Ser. No. 686,719
36 Claims. (Cl. 136—90)

This invention relates to primary cells, and more particularly to improved primary cells including a magnesium anode and an aqueous solution of a perchlorate salt as the electrolyte.

Primary cells are devices which convert stored chemical energy directly into electrical energy by an electrochemical process. Generally, the term primary cells refers to the class of cells in which the chemical reactions are not efficiently reversible. Cells having efficiently reversible chemical reactions are known as storage cells, or secondary cells, and may be recharged and used again. Primary cells are discarded once the chemical energy is converted to electrical energy. Primary cells that are manufactured to include a non-spillable electrolyte are referred to as dry cells. Primary cells that are asembled without one of the essential components, such as the electrolyte, but are adapted to supply electrical energy when the component is added just prior to use, are referred to as reserve cells.

A primary cell which is to be used as a portable power supply in any one of a variety of applications should have the following characteristics: long shelf life; low cost; a high flat operating voltage at a wide range of current drains; a high rate at which electrical energy can be withdrawn per unit of cell volume and weight; and a large capacity of electrical energy that can be withdrawn per unit of cell volume and weight.

Cells with magnesium anodes yield considerable electrical energy per unit of cell volume and weight. The term "magnesium anode" includes both substantially pure magnesium and magnesium-base alloys containing more than 50 percent magnesium. It has been previously known to use in magensium anode cells an electrolyte in which the solute is a magnesium compound such as magnesium perchlorate, and the solvent is an organic liquid such as pyridine, nitro-methane, or an alcohol. It has also been known that the solvent may be a mixture of an alcohol such as methanol with up to 70 percent by weight water. The prior practice of employing organic or alcohol-water solvents apparently is based upon the finding that aqueous solutions of some magnesium compounds are too corrosive. Aqueous solutions of magnesium compounds such as magnesium chloride attack magnesium anodes even when the cell is not in operation. It was then assumed that aqueous solutions of all magnesium compounds are too corrosive to be employed as the electrolyte in cells having magnesium anodes.

An object of this invention is to provide improved primary cells including magnesium anodes.

A further object of this invention is to provide an improved electromechanical system which may be employed in primary cells.

Another object is to provide an improved electrolyte for primary cells having magnesium anodes.

Still another object is to provide improved primary cells including materials which are comparatively inexpensive.

Yet another object is to provide improved primary cells having a relatively high flat operating voltage level over a wide range of current drains.

But another object is to provide improved primary cells having a high watt-hour and a high ampere-hour capacity per unit of cell volume and cell weight.

These and other objects and advantages are obtained by the present invention which provides improved primary cells including a magnesium anode with an electrolyte composed of a water-soluble percholate in an entirely aqueous solution. Suitable perchlorates include those of the alkali metals, the alkaline earth metals, and for reserve cells only the group consisting of aluminum, manganese, and zinc. The invention includes cells of the dry type, and the reserve type previously mentioned which are adaptable to supply electrical energy upon the addition of the electrolyte. Electrolytes consisting of the alkali metal perchlorates and the alkaline earth methyl perchlorates are substantially non-corrosive in such cells. It has unexpectedly been found that superior static and operating characteristics are obtained in magnesium anode cells employing aqueous perchlorate electrolytes.

The invention will be described in greater detail in connection with the accompanying drawings, in which.

Figure 15:
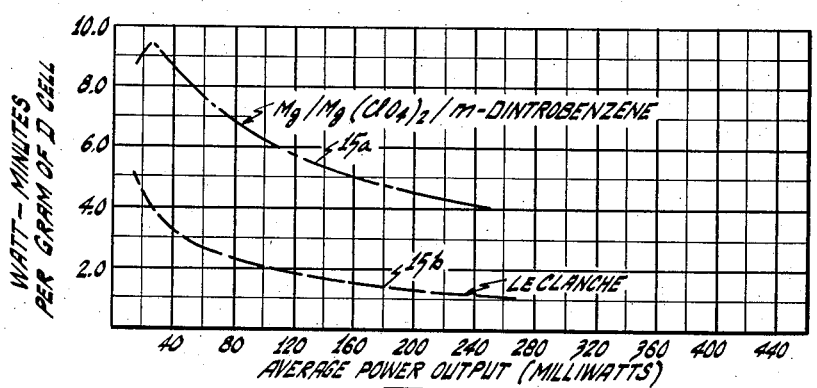
Figure 16:
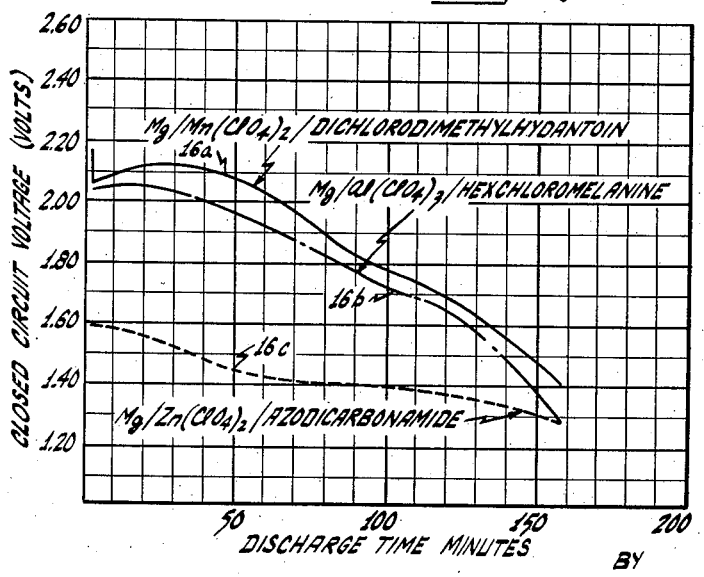

FIGURE 15 is a set of curves showing the capacity in watt-minutes per gram at various load resistances for the "D" size cells of Examples 21 through 24, together with the curve for a comparable prior art cell; and FIGURE 16 is a set of curves showing the change in cell voltage with respect to discharge time of Examples 26 through 28 of reserve cells according to the invention discharged continuously through a 4 ohm load.

Figure 17:
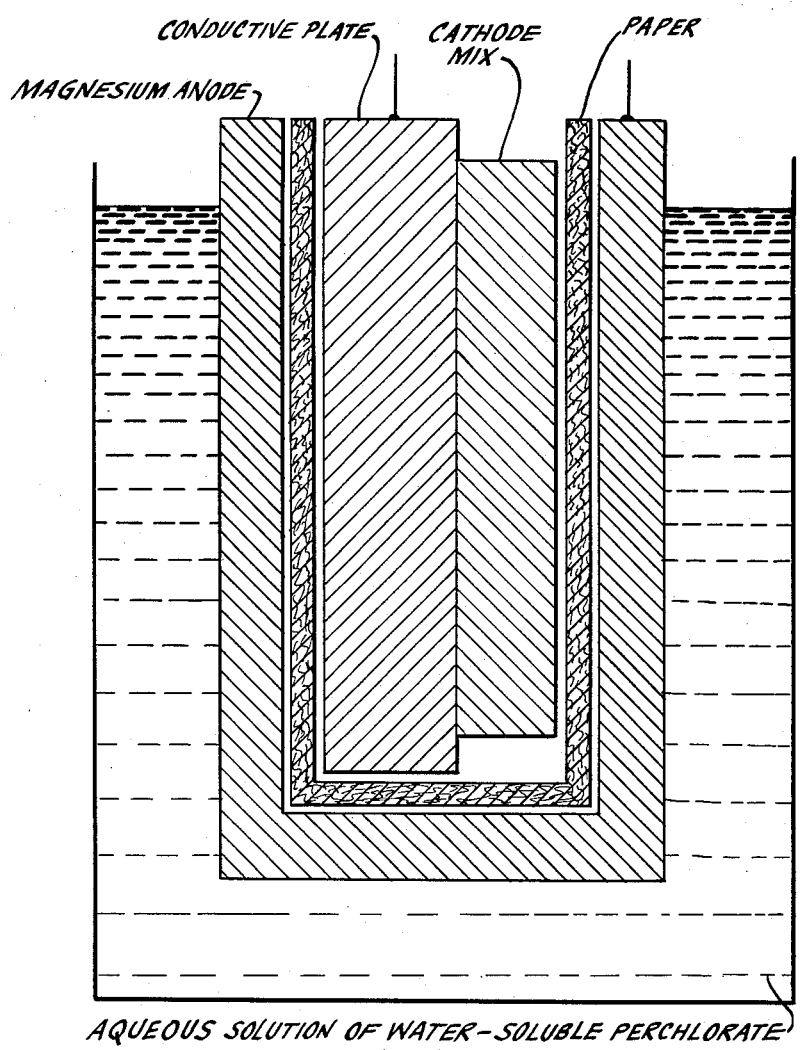

FIG. 17 is a schematic cross-sectional view of a reserve cell according to the invention.

To facilitate the explanation of the invention in detail, the construction and operating characteristics of several typical dry cells according to this invention are first described. These cells are then compared with the dry cells of the prior art, with particular emphasis in the comparison upon cell capacity and anode corrosion. Thereafter various electrolyte compositions, anode compositions, cathode compositions, and inhibiting materials are described. Finally a number of typical cells demonstrating particular representative combinations of aqueous perchlorate electrolytes and cathode materials, as well as the operating characteristics of each, are set forth and compared with several commercially available cells.

EXAMPLE 1

Figure 1:
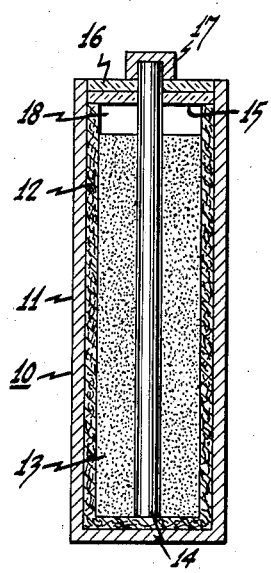
FIGURE 1 is a cross-sectional elevational view of a typical dry cell according to the invention.

Referring to FIGURE 1, a dry cell 10 of conventional design may be prepared as follows: a metallic anode 11 is provided in the form of a cup of a standard "AA" size, or other standard size such as "D." (American Standards Association, Bureau of Standards, Washington, D.C.) For Examples 1 through 20 "AA" size cups were used, while in Examples 23 through 27 "D" size cups were employed. The anode 11 has the approximate composition 98.4% magnesium, 1.0% aluminum, 0.5% zinc and 0.10% calcium. This alloy composition is sometimes designated AZ10A. The anode 11 is lined with a separator 12 comprising an absorbent kraft paper. Within the compartment, of which the separator 12 now forms the outer wall, is a cathode mixture 13 of materials comprising a cathode depolarizer, an ingredient for increasing the conductivity of the composition, an electrolyte, and a corrosion inhibitor. The separator 12 keeps the anode 11 and cathode 13 apart while providing therebetween a low resistance path to the flow of ions during the electrochemical process.

The mixture 13, including the cathode material and electrolyte, hereinafter referred to as the cathode mix, is prepared of the following constituents in the proportions indicated:

174 grams $MnO_2$, type WB, P–1 Synthetic type supplied by the Manganese Chemicals Corporation of Minneapolis, Minnesota, as the cathode depolarizer 20 grams Shawinigan acetylene black to increase the conductivity of the cathode composition 6 grams $BaCrO_4$ to inhibit corrosion 110 ml. of an electrolyte consisting of an aqueous solution containing 250 grams $Mg(ClO_4)_2$ and 1 gram of $Li_2CrO_4.2H_2O$ per liter of water, saturated with $Mg(OH)_2$ to adjust pH Approximately 8 grams of the cathode mix is formed as a cylindrical slug or bobbin and inserted in the paper lined anode 12 to form the cathode. A carbon rod 14 is inserted into the mix 13 to provide electrical connection thereto. The anode 11 is sealed by an insulating washer 15 mounted on the carbon rod, and a layer 16 of hard wax on the washer. The wax may for example be a high melting paraffin, or a tar base material such as Amperole 8. A metal contact cap 17 of brass is placed on carbon rod 14. An air space 18 is provided between the washer 15 and the cathode 13. The anode and cathode may now be connected through an external load. The cell then commences to deliver current by electrochemical action.

EXAMPLE 2

A similar dry cell utilizing natural manganese dioxide (also known as African manganese dioxide) and constructed substantially as the cell of Example 1 as shown in FIGURE 1, may be prepared with a cathode mix as follows:

174 grams $MnO_2$, African
20 grams Shawinigan acetylene black
6 grams $BaCrO_4$
120 ml. aqueous solution containing 250 grams $Mg(ClO_4)_2$ and 1 gram of $Li_2CrO_4.2H_2O$ per liter of water, saturated with $Mg(OH)_2$

Prior art example

Figure 2:
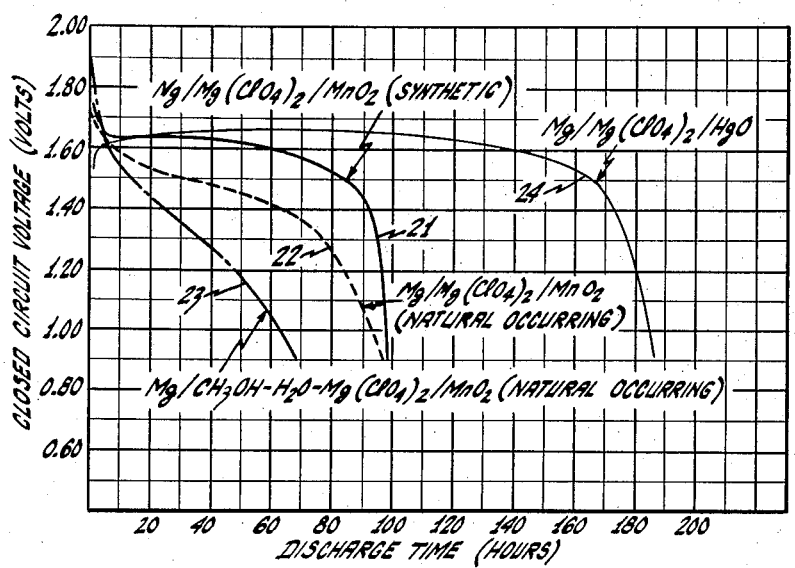
FIGURE 2 is a set of curves showing the change in cell voltage with respect to discharge time of Examples 1 and 2 and Examples 16 and 17 of "AA" size dry cells of the invention when discharged continuously through a 150 ohm resistance, together with a curve for a comparable dry cell according to the prior art.

A dry cell, constructed substantially the same as the cell of Example 1 as shown in FIGURE 1, is made according to the teachings of the prior art employing an electrolyte of $Mg(ClO_4)_2$ in a methanol-water solvent as follows:

100 grams $MnO_2$ (African)
12.5 grams Shawinigan acetylene black
5.5 grams $K_2CrO_4$
59 ml. methanol solution containing 250 grams of $Mg(ClO_4)_2.6H_2O$, 158 cc. water and 200 cc. methanol Referring to FIGURE 2, characteristic initial discharge curves for "AA" size dry cells discharged continuously through a 150 ohm load resistance are shown. The 150 ohm load resistance simulates the current drain requirements of a transistor-operated portable radio, for example. Curve 21 shows the characteristic discharge curve for the cells of Example 1 which employ type WB, P–1 synthetic manganese dioxide cathode material. Curve 22 shows the characteristic discharge curve for cells of Example 2 which employ African manganese dioxide. This cell will hereinafter be referred to as the aqueous mangnesium perchlorate cell. For comparison, curve 23 shows the characteristic discharge curve for the prior art cell described above which has an African manganese dioxide cathode, a magnesium alloy anode, and an electrolyte consisting of magnesium perchlorate in a water-alcohol solvent discharged under similar conditions. This prior art cell will hereinafter be described and referred to as the alcohol electrolyte cell. The dry cells of Examples 1 and 2 exhibit high, flat voltage curves resulting in a more uniform performance of the equipment which is operated from electric power therefrom. Not only is the voltage higher but the dry cells of Examples 1 and 2 also supply power for longer periods to 0.9 volt cut-off than the alcohol electrolyte cell. This cut-off voltage represents the practical voltage below which most portable equipment becomes inoperative.

Figure 3:
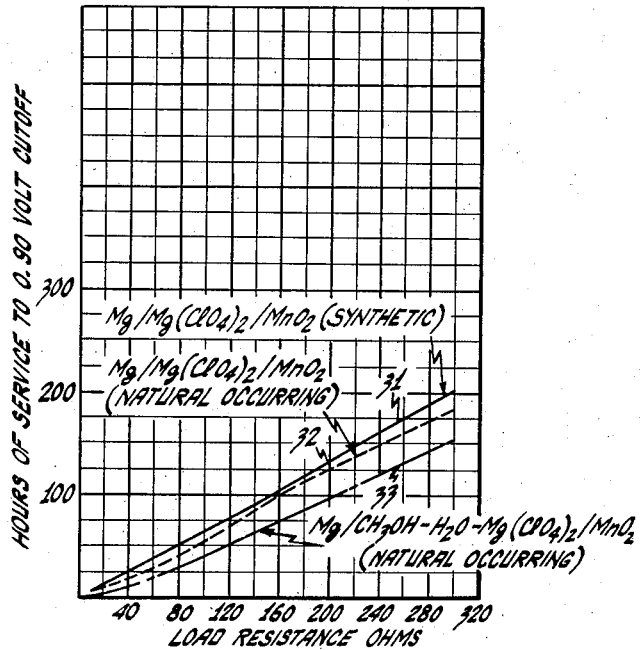
FIGURE 3 is a set of curves illustrating the hours of service delivered by the cells of Examples 1 and 2 for various load resistances together with a curve for a comparable prior art dry cell.

Referring now to FIGURE 3, the dry cells of Examples 1 and 2 are compared for hours of service to an 0.9 volt cut-off for various load resistances. Curves 31 and 32 show, respectively, the hours of service at various loads for the cells of Examples 1 and 2. The prior art cell using the alcohol electrolyte referred to previously is shown for comparison in curve 33. The dry cells of Examples 1 and 2 provide more hours of service over a wide range of current drains than the cells of curve 33.

Figure 4:
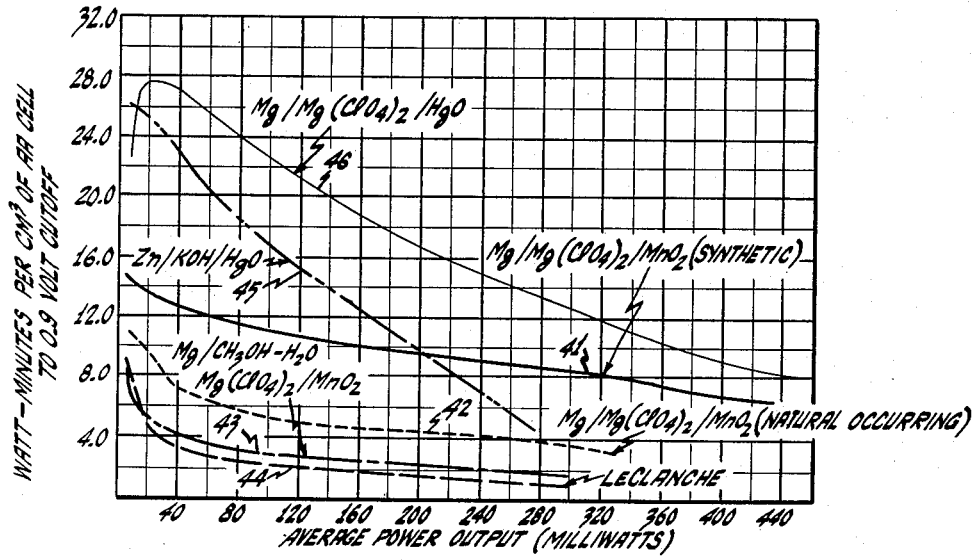
FIGURE 4 is a set of curves illustrating the watt-minutes per cubic centimeter at various power outputs for the cells of Examples 1 and 2 and Examples 16 and 17, together with curves for comparable dry cells utilizing other electrochemical systems.

Referring now to FIGURE 4, the dry cells of Examples 1 and 2 are compared as to capacity in watt-minutes per cubic centimeter to an 0.9 volt cut-off for various power outputs. Summary curve 41 shows the watt-minutes per cc. for the cells of Example 1. Curve 42 similarly shows the capacity in watt-minutes per cubic centimeter for the cells of Example 2. It will be noted in FIGURES 2 through 5 that the cells of Example 1, which contain synthetic manganese dioxide, perform somewhat better than the cells of Example 2, which contain African manganese dioxide. Summary curve 43 shows the watt-minutes per cc. for the alcohol electrolyte cell. Curve 44 shows the watt-minutes per cc. for the conventional dry cell using zinc/zinc chloride-ammonium chloride/manganese dioxide, African (LeClanche cell). Curve 45 shows the watt-minutes per cc. for the well-known mercury cell employing the system: HgO/KOH/Zn. The dry cells of Examples 1 and 2 provide more power per unit volume over a wide range of current drains than the prior art cells of curves 43 and 44. With respect to the mercury cell, the cells of Example 1 provide more watt-minutes per cc. at higher power outputs, and are considerably less expensive.

Figure 5:
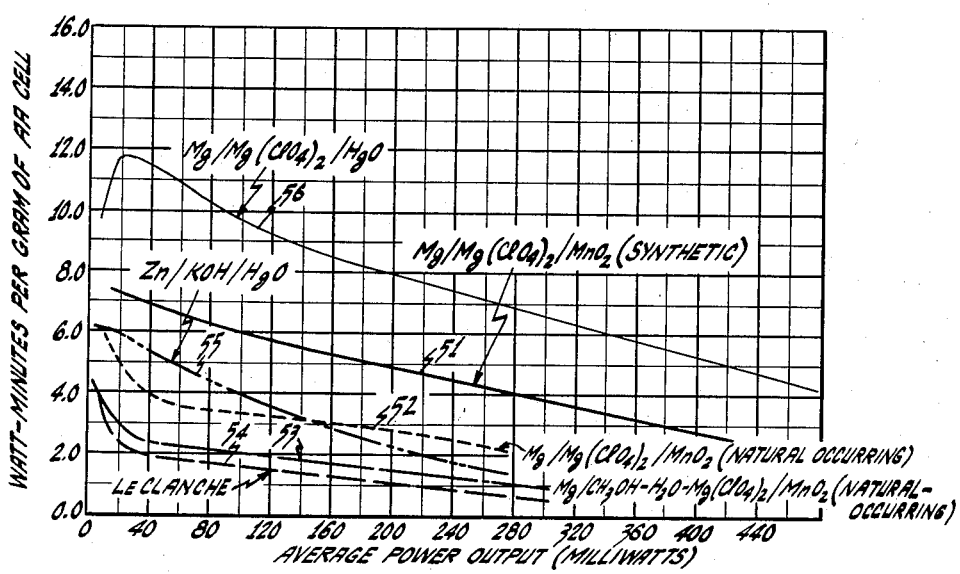
FIGURE 5 is a set of curves illustrating the watt-minutes per gram at various power output levels for the cells of Examples 1 and 2 and Examples 16 and 17, together with curves for comparable dry cells of the prior art.

In FIGURE 5, the dry cells of Examples 1 and 2 are compared as to watt-minutes per gram of cell to an 0.9 volt cut-off for various power outputs. Summary curve 51 shows the watt-minutes per gram for the cells of Example 1. Curve 52 shows the watt-minutes per gram for the cells of Example 2. Summary curve 53 shows the watt-minutes per gram for the alcohol electrolyte cell. Curves 54 and 55 show the watt-minutes per gram for the LeClanche and mercury cells referred to previously. The dry cells of Example 1 provide more total power per unit weight over a wide range than any of the prior art cells referred to.

It is thus apparent from FIGURES 2 to 5 that the dry cells of Examples 1 and 2 provide a more uniform voltage over a longer period of time than the prior art cells such as the LeClanche cell. In addition, the dry cell of Example 1 is cheaper than the mercury cell and, in fact, supplies more power for a longer time at high current drain than the mercury cell. Hence portable electronic equipment utilizing the dry cells of Examples 1 and 2 may be operated more uniformly over longer periods of time. Furthermore, the dry cells of Examples 1 and 2 employ an electrolyte which is less expensive than the alcoholic solutions of magnesium perchlorate and has substantially better performance than the alcohol electrolyte cell described. Whereas the alcohol electrolyte cell drops to 0.9 volt at about 62 hours, the cells of Examples 1 and 2 do not reach this voltage until about 97 hours under a 150 ohm drain. In addition, the dry cell of Example 1 supplies a substantially uniform voltage of over 1.4 volts for at least 92 hours. The cells of Examples 1 and 2 also supply at least twice as many watt-minutes per cubic centimeter as the watt-minutes per cc. supplied by the alcohol electrolyte cell. The same is also true in comparing the watt-minutes per gram for the cells of Examples 1 and 2 with the alcohol electrolyte cell. Inasmuch as the prior art teaches the alcoholic solutions are preferred because of the corrosiveness of aqueous solutions, investigations were made to determine the extent of corrosion of magnesium anodes. In view of the teachings of the prior art, corrosiveness in cells employing the solutions of the invention were found to be unexpectedly low. When the low corrosion rate of cells made according to the instant invention is considered in conjunction with the undoubtedly superior operating characteristic of these cells, as demonstrated in Examples 1, 2, and 3, it will be appreciated that the invention provides cells of outstandingly improved performance.

According to investigations made in connection with the instant invention, it appears that anode corrosion is more dependent upon the electrolyte salt than upon the solvent. Specifically, the aqueous solutions of the most suitable halide compounds of magnesium are markedly more corrosive to a magnesium anode than aqueous solutions of magnesium perchlorate. Magnesium iodide is not considered since it is much more expensive than magnesium perchlorate, and reacts with the more active cathode materials. (It should be appreciated that a magnesium compound electrolyte is preferred in cells employing magnesium anodes in order to keep the complexity of the ion system in the cell at a minimum.)

Figure 6:
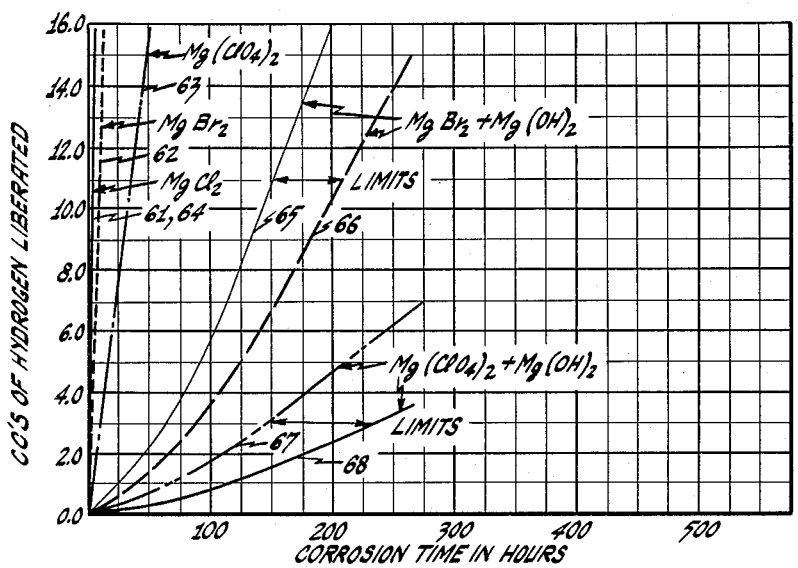
FIGURE 6 is a set of curves illutsrating the volume of hydrogen released with respect to time for the reaction of various magnesium salt solutions with magnesium.

FIGURE 6 shows characteristic corrosion curves for various magnesium salt solutions measured in terms of the volume of hydrogen released by reaction with magnesium. Solutions of $MgCl_2$, $MgBr_2$, and $Mg(ClO_4)_2$ are compared. The data were derived by placing a magnesium cylinder of ½″ diameter in a solution of the salt. When the pH of the various solutions was adjusted by employing $Mg(OH)_2$, the superior performance of the perchlorate solution was not only maintained but actually improved to a greater extent than the halide solutions. Thus with aqueous solutions it appears that the corrosion of magnesium is very markedly dependent upon the nature of the electrolyte salt employed.

The following table indicates the nature and concentration of some of the various solutions investigated and the corrosion rate of the magnesium samples by these solutions. The temperature in all instances as 70° F. Two examples of magnesium bromide—magnesium hydroxide solutions are given, and two examples of magnesium perchlorate—magnesium hydroxide solutions, so as to show the upper and lower limits which may be expected.

TABLE I.—CORROSION RATE: VARIOUS Mg. SALT SOLUTIONS

| Curve No. From Fig. 6 | Solution, g./liter of $H_2O$ | Vol. of $H_2$ Released in cc. | Total Time in Hours | Average rate of Release, cc. per Hr. |
|---|---|---|---|---|
| 61 | 228 gms.$MgCl_2.6H_2O$ | 16 | 5 | 3.2 |
| 62 | 440 gms.$MgBr_2.6H_2O$ | 16 | 10 | 1.6 |
| 63 | 250 gms.$Mg(ClO_4)_2$ | 16 | 45 | 0.355 |
| 64 | 228 gms.$MgCl_2.6H_2O$ | 16 | 5 | 3.2 |
| (same as 61) | 10 gms.$Mg(OH)_2$ | | | |
| 65 | 440 gms.$MgBr_2.6H_2O$+ 10 gms.$Mg(OH)_2$. | 16 | 200 | 0.080 |
| 66 | 440 gms.$MgBr_2.6H_2O$+ 10 gms.$Mg(OH)_2$. | 16 | 275 | 0.058 |
| 67 | 250 gms.$Mg(ClO_4)_2$+10 gms.$Mg(OH)_2$. | 6.6 | 270 | 0.024 |
| 68 | 250 gms.$Mg(ClO_4)_2$+10 gms.$Mg(OH)_2$. | 3.5 | 270 | 0.013 |

It will be noted that the aqueous perchlorate solutions are unexpectedly far less corrosive than the aqueous halide solutions. Magnesium bromide is not only corrosive, but also has the disadvantage that it may be oxidized by cathode materials which are strong oxidizing agents, such as silver oxide and synthetic manganese dioxide. Magnesium bromide has another disadvantage as an electrolyte in magnesium anode cells, due to the tendency of bromide ions to form complexes with the cation of such cathode materials as cupric oxide, mercuric oxide, and silver oxide.

The primary cells of the invention comprise generally the following parts:

(1) an anode selected from the group of materials consisting of magnesium and magnesium-base alloys,
(2) a cathode including a depolarizer consisting of an oxidizing substance selected from a large group of materials. These oxidizing substances may be aliphatic azo groups, nitroso groups, nitro groups, N-halogens, copper hydroxide, the oxides of bismuth, manganese, lead, silver, nickel, mercury, and copper. The cathode may also include other materials such as finely divided carbon, for example, carbon blacks such as Shawinigan acetylene black, G. Cabot experimental battery black, Atlas Powder Co. Darco G–60, and Acheson graphite No. 615, for increasing the conductivity of the cathode and for holding the electrolyte,
(3) an electrolyte which includes a water soluble perchlorate or a mixture of water soluble perchlorates. These perchlorates may be selected from the group consisting of aluminum, manganese, zinc, the alkali metals and alkaline earth metals. The electrolyte may also include a material for inhibiting the corrosion of the anode.

The anode

The anode for the primary cells of the invention may be magnesium or magnesium-base alloys. While any magnesium-base alloy having more than 50 percent magnesium may be used, it is preferable to have as high a proportion of magnesium as possible. Other ingredients are added to magnesium to improve the properties of the anode for fabrication purposes, to impart a greater degree of corrosion resistance, or for other reasons. Table II sets forth examples of magnesium-base alloys which are suitable for anode material, together with the corresponding ASTM designations.

TABLE II.—ANODE COMPOSITIONS

| Alloy No. | A.S.T.M. Designation | Al | Nominal Composition [1] | | | | |
|---|---|---|---|---|---|---|---|
| | | | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.10 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, may be the lining of the container, or may be a separate structure inserted in the container. The magnesium anode may be in any geometrical configuration desired.

It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethylcellulose, polyvinyl alcohol, or a starch-flour gel. The coating on the kraft paper promotes adhesion of the paper to the anode and maintains good electrical contact between the electrolyte and the anode. Porous ceramics or other inorganic or organic structures may be used in place of paper.

The electrolyte

The electrolyte is an aqueous solution containing a soluble perchlorate. Since a magnesium anode is employed in the primary cells of the invention, it is preferred to employ an aqueous solution of magnesium perchlorate to keep the electrochemical system comparatively simple and uncomplicated. However, other water-soluble perchlorates may be employed, such as the perchlorates of the alkali metals; the alkali earth metals; and the group consisting of manganese, aluminum, and zinc. The electrolyte may be prepared by dissolving the perchlorate, for example magnesium perchlorate, in water in a concentration ranging from about 50 grams per liter to the concentration required to produce a saturated solution at ordinary temperatures. For example, a preferred concentration of anhydrous magnesium perchlorate is about 250 grams per liter. The concentration does not appear to be critical, although for best results certain concentrations are to be preferred depending upon the particular perchlorate used. Combinations of these perchlorates may also be used.

It is also desirable to include in the electrolyte one or more salts of chromic acid in sufficient amounts to inhibit corrosion. Suitable chromic acid salts are those of the alkali metals, the alkaline earth metals, and ammonium. The chromic acid salts may be used in proportions between .01 gram per liter of solution up to concentrations producing saturation in the presence of the dissolved perchlorate. A preferred concentration of hydrated lithium chromate is about .05 to 2.0 gram per liter of solution. Examples of corrosion-inhibiting salts are sodium chromate, ammonium chromate, potassium dichromate, lithium dichromate, magnesium chromate, calcium chromate and barium chromate. Mixtures of the chromates may also be used.

For certain applications, principally where a long shelf life is required, it is desirable to omit one of the essential components until the need for electrical energy arises. The primary cells of the invention are particularly adaptable to preparation as reserve cells, for example, by omitting the electrolyte until just prior to use. In reserve cells the more corrosive perchlorates, such as those of manganese, zinc, and aluminum, may be used. These perchlorates provide an electrolyte which is more acidic than the other perchlorates mentioned, so that the cathode has a higher operating potential than in more basic electrolytes.

The cathode

As will be apparent from the numerous examples following hereinafter, the cathode or oxidizing substance may be selected from a large group including inorganic as well as organic oxidizing substances in whole or in part.

Inorganic oxidizing substances

In general the inorganic oxidizing substances which will be used for a cathode material are the oxides of various metals. Among the more important oxides are those of copper (both cupric and cuprous), manganese, lead, silver, bismuth, nickel, and mercury (both red and yellow oxides). Other oxidizing substances which may be used as a cathode material include copper hydroxide, copper chloride, and silver chloride.

Organic oxidizing substances

The cathode may also include organic oxidizing substances in which the oxidizing properties are due at least in part to chemically combined organic groups. These organic oxidizing materials may be grouped as: (1) nitro compounds; (2) nitroso compounds; (3) aliphatic azo compounds; and (4) N-halogen compounds. During the electrochemical action, the substance undergoes a reduction as the primary cells furnish electric current.

Nitro compounds

The organic nitro compounds which are insoluble in conventional electrolytes are particularly suitable for use as cathode materials in dry cells. These organic nitro compounds are disclosed in detail in a copending application of C. K. Morehouse and R. Glicksman, Serial No. 591,050, filed June 13, 1956, now Patent No. 2,880,122, and assigned to the instant assignee. Some of these insoluble organic nitro compounds are liquids which are immiscible in the electrolyte and can be adsorbed by materials such as acetylene black or graphite.

The following list gives examples of nitro compounds which are useful in the primary cells of the invention. While the above-referred to copending application lists many more specific organic nitro compounds, only a few will be mentioned herein.

A. Benzene compounds having one nitro group per ring:
  Nitrobenzene
   o-and m-and p-Nitrotoluene
   o-and m-and p-Nitrobenzamide
B. Benzene compounds having two nitro groups per ring:
   m-and p-dinitrobenzene 3,5 dinitrobenzamide
2,4 dinitrotoluene
2,4 dinitroanisole
C. Benzene compounds having three nitro groups per ring:
    2,4,6 trinitroaniline
    5-tert-butyl-2,4,6-trinitro-m-xylene
D. Polynuclear aromatic compounds:
    2,4-dinitro-1-naphthol-7-sulfonic acid
    2,4-dinitro-1-naphthol
    1-nitronaphthalene
E. Quinone compounds:
    2-nitrophenanthraquinone
    5-nitro-1-anthraquinone sulfonic acid
    Nitroalizarine
F. Nitroso compounds:
    metanitrosonitrobenzene
G. Benzimidazoles:
    6-nitrobenzimidazole
H. Indazoles:
    5-nitroindazole
I. Quinolines:
    5-nitroisoquinoline
    6-nitroquinoline
    8-nitroquinoline
J. Thiophene derivatives:
    2-nitrothiophene
K. Triazole derivatives:
    5-nitrobenzotriazole
L. Furan derivatives:
    5-nitro-2-furanmethanodioldiacetate
    2-nitrofuran
    2-methyl-5-nitrofuran
    2,5-dinitrofuran
M. Pyridone derivatives:
    3-cyano-5-nitro-2-pyridone
N. Pyridine derivatives:
    ethyl-2-methyl-5-nitronicotinate
O. Amidines of carbonic acid:
    nitroguanidine
P. Cyclic ureides:
    5-nitrobarbituric acid
    5-nitrouracil
Q. Alkane derivatives:
    2,2-chloronitropropane
    2,2-dinitropropane
    tetranitromethane
    1,1,4,4-tetrabromo-1,4-dinitrobutane
R. Aliphatic alcohols:
    2-nitro-2-ethyl-1,3-propanediol
    2-nitro-1-butanol
S. Aliphatic acid derivatives:
    4-bromo-4,4-dinitrobutyric acid
T. Aliphatic ester derivatives:
    Dimethyl-5,5-dinitro-2,8-diaza-1,9-nonanedioate
    Dimethyl-4,4-dinitro-1,7-heptanedioate
    2-nitroisobutylphosphate
    2-nitroisobutylacetate
    2-chloro-2-nitropropyl ester of dicarboxylic acids from carbonic up to sebacic acid
U. Aliphatic ketone derivatives:
    2-nitro-1,3-indanedione
V. Aliphatic aldehyde derivatives:
    Sodium nitromalonaldehyde
W. Combinations of aromatic and aliphatic compounds:
    2-chloro-2-nitropropyl esters of dicarboxylic acids from carbonic up to sebacic acid Any organic compound having a nitro group is useful in the cathodes of the primary cells of the invention. The primary cells of the invention all utilize the electron change obtained in converting a nitrogen atom with a valence of plus 3 in a nitro group to a nitrogen radical with a valence of minus 3 as in an amine group. This is shown schematically by the following equation:

$$N^{+3} + 6e \rightarrow N^{-3}$$

In addition to a nitro group, the nitro organic compounds may have other groups in their structure, for example, the following groups may be included: $-CONH_2$, $-SO_3H$, $-CHO$, $-Ar$, $-COOAr$, $-CO_2H$, $-CO_2R$, $-X$, $-COR$, $-COCO_2H$, $-CN$, $-CX_3$, $-NH^+_3$, $-OH$, $-OR$, $-OA_c$, $-NO$, $-NH_2$, $-NHR$, $-NR_2$, $-NHA_c$, $-N=N-$, $-CH_3$, $-CH_2SO_3H$, $-NAr_2$, $-CH_2CO_2H$, $-CH_2NH_2$, $-CH_2CN$, $-CH_2CH_2CO_2H$, $-CH=CHCO_2H$, $-CH=CHNO_2$, $-C=CCO_2H$, $-C_6H_5$, Na, K; where R represents an alkyl radical, Ar represents an aromatic radical and X represents a halogen.

A nitro organic compound may include more than one nitro group in its structure. Although all nitro organic compounds may be used in primary cells of the invention, some of the more complex compounds having more than two nitro groups are unstable and, as a practical matter, would not be employed in their unstable state. In addition, various ones of the foregoing groups may be combined in a nitro organic compound to vary its potential, solubility, stability and capacity. For example, when meta-directing groups, such as $-NO_2$, $-SO_3H$, $-COOH$, are combined in compounds including a benzene ring, then primary cells employing such compounds as cathode materials have a higher operating voltage. As another example, when a nitro organic acid compound is esterified, its solubility is decreased. The cathodes of the primary cells of the invention may also comprise a mixture of one or more nitro organic compounds, or a mixture with one or more other organic oxidizing compounds, such as nitroso organic compounds, or with inorganic cathode materials such as manganese dioxide or the like.

*Nitroso compounds*

The nitroso compounds which are insoluble in conventional electrolytes are particularly suitable for use as cathode materials in dry cells. These nitroso compounds are described in detail in a copending application of C. K. Morehouse, Serial No. 591,051, filed June 13, 1956, now Patent No. 2,855,452, and assigned to the instant assignee. Some of these insoluble nitroso organic compounds are immiscible in the electrolyte and can be adsorbed by materials such as acetylene black or graphite. Nitroso compounds soluble in the cell electrolyte may be used in reserve cells.

The following list includes some of the nitroso compounds which are useful in preparing primary cells according to the invention. The members of the list are intended as examples only.

A. Aromatic benzene C-nitroso compounds:
    Nitrosobenzene
    p-Nitrosodimethylaniline and salts thereof such as:
        Chlorides,
        Nitrates and
        Sulfates
    p-Nitrosodiethylaniline and salts thereof such as:
        Chlorides,
        Bromides,
        Nitrates, and
        Sulfates
    4-nitroso-3-methyldimethylaniline
    N, 4-dinitroso-N-ethylaniline
    4-nitroso-3-hydroxyacetanilide
    Isomers of nitrosobenzoic acid and salts and esters thereof
    Isomers of halo-nitrosobenzenes such as:
        2 chloronitrosobenzene,
        3 chloronitrosobenzene,
        2 bromonitrosobenzene,
    Alkoxyl isomers such as:
        2 methoxynitrosobenzene, and
        3 ethoxynitrosobenzene B. Aromatic benzene C-nitroso compounds containing another oxidizable group on ring such as —$NO_2$:
   m-nitronitrosobenzene
   4-nitroso-3-nitrotoluene
C. Aromatic naphthalene C-nitroso compounds:
   1-nitroso-2-naphthol
   2-nitroso-1-naphthol
   1-nitroso-2-naphthol-3,6-disulfonic acid disodium salt
D. Aromatic quinoline C-nitroso compound:
   5-nitroso-8-hydroxy quinoline
E. Alicyclic C-nitroso compounds:
   2-chloro-1-methyl-2-nitrosocyclohexane
   2-chloro-2-nitrosopinane
   2-chloro-2-nitrosocarene
F. Aromatic benzene C-dinitroso compounds:
   2,4-dinitrosoresorcinol
   p-dinitrosobenzene
G. Aromatic naphthalene C-dinitroso compounds:
   1,4-dinitrosonaphthalene
H. Aliphatic C-nitroso compounds:
   2-nitro-2-nitrosopropane
   2-nitroso-2-methyl propane
   2-chloro-2-nitrosobutane
   Trichloronitrosomethane Any nitroso organic compound may be used in the cathodes of the primary cells of the invention. The primary cells of the invention all utilize the electron change obtained by converting a nitrogen atom with a valence of +1, as in a nitroso group, to a nitrogen radical with a valence of —3 as in an amine group. This is shown schematically by the following equation:

$$N^{+1} + 4e^- \rightarrow N^{-3}$$

In addition, such compounds may have other groups in their structure which alter their physical and chemical properties to affect the stability and solubility in the electrolyte. It is also recognized that, by changing the structure of the nitroso organic compounds, one may alter the theoretical capacity, shelf life and the rate at which electric energy can be withdrawn from the cell can be altered. The selection of the particular compound and its structure will depend on the application for which the particular primary cell is intended. The utility of the nitroso organic compounds may be further enhanced by the presence of oxidizing groups such as nitro, azo, etc. groups which will increase the theoretical capacity.

The cathodes of the primary cells of the invention may also comprise a mixture of one or more nitroso organic compounds, or a mixture with one or more other organic oxidizing compounds, such as nitro organic compounds, or with inorganic cathode materials such as manganese dioxide or the like.

*Aliphatic azo compounds*

The aliphatic azo organic compounds which are insoluble in conventional electrolytes are particularly suitable for use as cathode materials in dry cells. These aliphatic azo organic compounds are described in detail in a copending application of C. K. Morehouse and R. Glicksman, Serial No. 591,122, filed June 13, 1956, now Patent No. 2,836,644, and assigned to the instant assignee. Azo organic compounds soluble in the cell electrolyte may be used in reserve cells.

The following list includes some of the azo organic compounds which are useful in preparing primary cells according to the invention. The members of the list are intended as examples only.

A. N,N' dichloroazodicarbonamidine
B. N,N' dibromoazodicarbonamidine
C. Azodicarbonamide and acid salts thereof such as:
   Azodicarbonamide nitrate and
   Azodicarbonamide sulfate
D. Azoformic acid and inorganic salts thereof such as:
   Sodium azoformate and
   Potassium azoformate
E. Alkyl and aryl ester of azoformic acid such as:
   Ethyl azoformate,
   Methylazoformate,
   Phenylazoformate and
   Isobutylazoformate
F. Nitro alkyl and aryl esters of azoformic acid such as:
   2-chloro-2-nitropropyl azoformate,
   3,3'-dinitrobutylazoformate and
   2,4-dinitrophenylazoformate Any azo organic compound may be used in the cathodes of the primary cells of the invention. The primary cells of the invention all utilize the electron change obtained by converting a double bonded nitrogen to a single bonded nitrogen. This is shown schematically by the following equation:

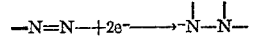

Under more vigorous conditions, it may be possible to obtain further reduction.

In addition, such compounds may have other radicals in their structure which alter their physical and chemical properties to affect the stability and solubility in the electrolyte. It is also recognized that by changing the structure of the azo organic compounds, the theoretical capacity, shelf life and the rate at which electric energy can be withdrawn from the cell can be altered. The selection of the particular compound and its structure will depend on the application for which the particular primary cell is intended. The utility of the azo organic compounds may be further enhanced by the presence of oxidizing radicals such as nitro groups, positive halogen groups, etc. which increase the theoretical capacity.

The cathodes of the primary cells of the invention may also comprise a mixture of one or more azo organic compounds, or a mixture with one or more other organic oxidizing compounds such as a nitro organic compound, or with inorganic cathode materials such as manganese dioxide.

*N-halogen compounds*

The cathode may include an organic oxidizing substance in which the oxidizing properties are due at least in part to positive halogens combined in said substance. The halogens include chlorine, bromine and iodine. These substances are also referred to as positive halogen organic compounds and are disclosed in detail in a copending application of C. K. Morehouse and R. Glicksman, Serial No. 591,195, filed June 13, 1956, now Patent No. 2,874,204, and assigned to the instant assignee. During the electrochemical action, the substance undergoes a reduction as the primary cell furnishes electric current.

An organic oxidizing substance containing positive halogens, when treated with water yields hypohalous acid, a powerful oxidizing agent, of the form HOX, where X designates any one of the following halogen group: chlorine, bromine and iodine. Thus a test for a positive halogen comprises reacting the material in question with an acidified aqueous solution of an iodide compound which is oxidized by the hypohalous acid liberated by the reaction of the substance with water, liberating iodine. For example, the following equations illustrate the release of iodine by a reaction between water, N,N dichloromethylamine, and hydrogen iodide:

$$(CH_3)_2NCl_2 + 2HOH \rightarrow (CH_3)_2NH_2 + 2HOCl$$

$$2HOCl + 4HI \rightarrow 2I_2 + 2HCl + 2HOH$$

Some of the positive halogen organic compounds are relatively insoluble in conventional electrolytes and are particularly suitable as cathode materials in dry cells. Some of the insoluble positive halogen organic compounds are also liquids which are immiscible with the electrolyte and can be adsorbed by a material such as acetylene black or graphite. Some of the positive halogen organic compounds may be soluble in the cell electrolyte. These substances may be used in reserve cells.

The following list includes some of the positive halogen organic compounds which are useful in preparing the primary cell according to the invention. The members of the list are intended as examples only. In the list, X is meant to refer to a halogen atom, such as chlorine, bromine or iodine.

A. Amines of the general formula RNHX, RNX$_2$, R$_2$NX where R is an alkyl radical. A typical example of this class is:
  N,N-dichloromethylamine B. Amides:
  (1) Carboxylic acid amides—
    (a) Aliphatic monocarboxylic acid amides:
      N-chloroacetamide
      N-bromoacetamide
    (b) Aliphatic dicarboxylic acid amides:
      N,N'-dibromosuccinamide
      N,N'-dibromooxamide
      N,N'-dibromoadipamide
    (c) Aromatic monocarboxylic acid amides:
      N-bromobenzamide
    (d) Aromatic dicarboxylic acid amides:
      N,N'-dibromoterphthalamide
  2. Sulfonic acid amides of the formula RSCONHX and RSOCHX$_2$:
      Sodium salt of N-chlorobenzenesulfonamide
      Sodium salt of N-chloro-p-toluenesulfonamide
      N,N-dichloro-p-toluenesulfonamide and N,N-dibromo-p-toluenesulfonamide
  3. Derivatives of carbonic acid amides:
      N,N'-dichlorobiuret and dibromobiuret C. Imides derived from dibasic acids:
  N-chlorosuccinimide
  N-bromosuccinimide
  N-bromophthalimide
  Ethyl-N-bromophthalimide D. Quinone imides:
  N,2,6-trichloro-p-quinoneimine
  N-chloro-p-quinoneimine E. Cyclic ureides:
  N-monochloro and monobromo dimethylhydantoin
  N,N'-dichloro and dibromodimethylhydantoin
  N,N'-dichloro and dibromodiphenylhydantoin F. Amidines of carbonic acid:
  Trichloromelamine and tribromomelamine
  Hexachloromelamine
  Penta and tetra chloromelamines—these are mixtures of trichloro and hexachloromelamines
  N,N'-dichloroazodicarbonamidine
  Trichloroisocyanuric acid
  N-chloroacetoguanamine
  N-chloropropoguanamine
  N-chlorodicyandiamide
  Dichloroisocyanuric acid Any positive halogen organic compound may be used as cathodes of the primary cells of the invention. The primary cells of the invention all utilize the electron change obtained in converting a positive halogen ion to a negative halogen ion. This is shown schematically by the following equation where X is a halogen:

$$X^+ + 2e^- \rightarrow X^-$$

In addition, such compounds may have other radicals in their structure which alter their physical and chemical properties to affect the stability and solubility in the electrolyte. I is also recognized that by changing the structure of the positive halogen organic compounds, the theoretical capacity, shelf life and the rate at which electrical energy can be withdrawn from the cell can be altered. The selection of the particular compound and its structure will depend on the application for which the particular primary cell is intended. The utility of the positive halogen organic compound may be further enhanced by the presence of oxidizing radicals such as nitro, azo, etc. groups that will increase the theoretical capacity.

The cathodes of the primary cells of the invention may also comprise a mixture of one or more positive halogen organic compounds, or a mixture with one or more other organic oxidizing compounds, such as quinones, or certain organic azo compounds, or with inorganic cathode materials such as manganese dioxide or the like.

The cathodes of the invention may be fabricated by a number of methods and in various shapes. In Examples 1 and 2 the method of preparing a mixture of powdered cathode materials with electrolyte and then pressing a quantity of the mixture to the desired shape and density was described. The cathode mix may also if desired include an inert binder such as polyvinyl alcohol, carboxymethylcellulose, methylcellulose, a vinyl resin, bentonite or silica gel. Such mixtures may be pressed as described above or cast to fabricate the cathode.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode, leaving a somewhat porous structure with a greatly increased proportion of active surface.

The presence of atmospheric oxygen enhances the capacity of the cathode of cells of various kinds. For example, capacity increases can be realized in the cells of FIGURE 1 by providing a small vent (e.g., 0.05 inch in diameter) in the wax layer 16. This may be done by preparing a tab (not shown) on the washer 15, which tab extends up through the wax seal 16. The maximum effect of the atmospheric oxygen is ordinarily obtained when the current drain is relatively light.

The following examples may be prepared and cells constructed and arranged according to the techniques and methods set forth in the description of Examples 1 and 2. Many variations in the anode, cathode, and electrolyte materials are possible and these possibilities are demonstrated by the following examples. Unless otherwise indicated all of the cells have magnesium anodes of the AZ10A alloy type as in the cells of Examples 1 and 2. Likewise all cells are dry cells unless otherwise noted.

EXAMPLE 3

A dry cell, constructed substantially the same as the cells of Examples 1 and 2 as shown in FIGURE 1, is made up with a cathode mix as follows:

348 g. MnO$_2$ (African)
40 g. Shawinigan acetylene black
12 g. BaCrO$_4$
200 ml. aqueous solution containing:
  376 g. of Ba(ClO$_4$)$_2$ and
  1 g. of Li$_2$CrO$_4$.2H$_2$O per liter of water saturated with Mg(OH)$_2$ The bobbin weight is 8 grams. The characteristic discharge curve at 50 ohm load for an "AA" size cell made according to this example is shown by curve 71 in FIGURE 7. At this drain the cell provides a voltage which does not decline to the 0.9 voltage cutoff until after some 32 hours.

EXAMPLE 4

Figure 7:
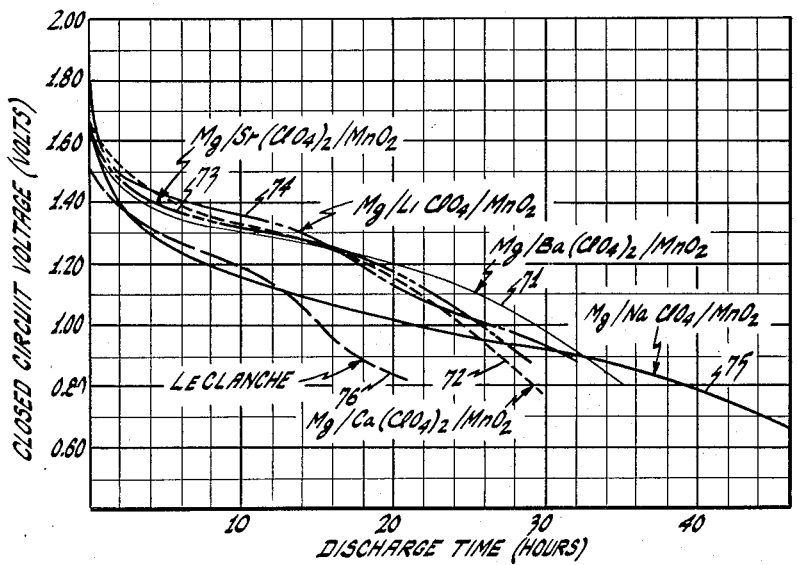
FIGURE 7 is a set of curves showing the change in cell voltage with respect to discharge time of Examples 3 to 8 of "AA" size dry cells of the invention when discharged continuously through a 50 ohm resistance, together with a curve for a comparable prior art cell.

A dry cell, constructed substantially the same as the cells of Examples 1 and 2 as shown in FIGURE 1, is made up with a cathode mix as follows:

348 g. of MnO$_2$ (African)
40 g. Shawinigan acetylene black
12 g. BaCrO$_4$
200 ml. aqueous solution containing:
  388 g. of Ca(ClO$_4$)$_2$.6H$_2$O and
  1 g. of Li$_2$CrO$_4$.2H$_2$O per liter of water saturated with Mg(OH)$_2$ The bobbin weight is 8 grams. Referring to FIGURE 7 the characteristic discharge curve at 50 ohm load for an "AA" size cell made according to this example is shown by curve 72. This cell does not reach the 0.9 voltage cutoff until about 26½ hours of operation.

EXAMPLE 5

A dry cell, constructed substantially the same as the cells of Examples 1 and 2 as shown in FIGURE 1, is made up with a cathode mix as follows:

348 g. $MnO_2$ (African)
40 g. Shawinigan acetylene black
12 g. $BaCrO_4$
200 ml. aqueous solution containing:
    434 g. of $Sr(ClO_4)_2.6H_2O$ and
    1 g. of $Li_2CrO_4.2H_2O$ per liter of water saturated with $Mg(OH)_2$ The bobbin weight is 8 grams. The characteristic discharge curve at 50 ohm load for an "AA" size cell made according to this example is shown by curve 73 in FIGURE 7. This cell reaches the 0.9 voltage cutoff after more than 28 hours of drain.

EXAMPLE 6

A dry cell, constructed substantially the same as the cells of Examples 1 and 2 as shown in FIGURE 1, is made up with a cathode mix as follows:

348 g. $MnO_2$ (African)
40 g. Shawinigan acetylene black
12 g. $BaCrO_4$
180 ml. aqueous solution containing:
    360 g. of $LiClO_4.3H_2O$ and
    1 g. of $Li_2CrO_4.2H_2O$ per liter of water saturated with $Mg(OH)_2$ The bobbin weight is 8 grams. The performance of this cell under a 50 ohm drain is shown by curve 74 in FIGURE 7. An "AA" size cell according to this example reaches the 0.9 voltage cutoff point after more than 31 hours of continuous operation.

EXAMPLE 7

A dry cell, constructed substantially the same as the cells of Examples 1 and 2 as shown in FIGURE 1, is made up with a cathode mix as follows:

348 g. of $MnO_2$ (African)
40 g. Shawinigan acetylene black
12 g. $BaCrO_4$
180 ml. aqueous solution containing:
    324 g. of $NaClO_4.H_2O$ and
    1 g. of $Li_2CrO_4.2H_2O$ per liter of water saturated with $Mg(OH)_2$ The bobbin weight is 8 grams. The characteristic discharge curve at 50 ohm load for an "AA" size cell according to this example is shown by curve 75 in FIGURE 7. It will be noted that at this light drain the 0.9 voltage cutoff is reached after more than 32 hours of discharge and that the cell has a long flat discharge characteristic throughout a substantial portion of its operation. For comparison, a LeClanche cell of the prior art is shown in curve 76.

EXAMPLE 8

A dry cell, constructed substantially the same as the cells of Examples 1 and 2 as shown in FIGURE 1, is made up with a cathode mix as follows:

348 g. $MnO_2$ (African)
40 g. Shawinigan acetylene black
12 g. $BaCrO_4$
200 ml. aqueous solution containing:
    217 g. $Sr(ClO_4)_2.6H_2O$
    194 g. $Ca(ClO_4)_2.6H_2O$ and
    1 g. of $Li_2CrO_4.2H_2O$ per liter of water saturated with $Mg(OH)_2$ The bobbin weight is 8 grams. The characteristic discharge curve at 50 ohm load for an "AA" size cell made according to this example is substantially the same as that of the cell according to Example 4. Hence, discharge curve 72 of FIGURE 7 also represents the performance of the cell of the instant example, there being less than 10% variation between the respective curves of each cell.

EXAMPLE 9

Figure 8:
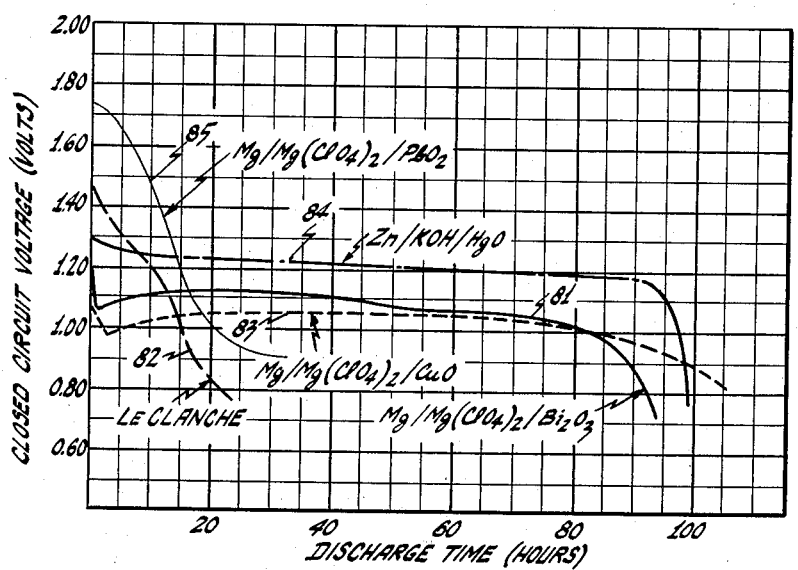
FIGURE 8 is a set of curves showing the change in cell voltage with respect to discharge time for Examples 9, 10 to 15, and 18 of "AA" size dry cells of the invention when discharged contiuously through 50 ohm resistance, together with curves for comparable prior art cells.

Another dry cell according to the invention may be prepared according to Example 1 except that the cathode mix has the following formulation:

450 g. $Bi_2O_3$
45 g. Shawinigan acetylene black
14.9 g. $BaCrO_4$
200 ml. aqueous solution containing:
    250 g. $Mg(ClO_4)_2$ and
    1 g. of $Li_2CrO_4.2H_2O$ per liter of water saturated with $Mg(OH)_2$ The bobbin weight is 10 grams. In FIGURE 8 this cell (curve 81) is compared for performance during discharge under a 50 ohm drain with the well-known LeClanche cell (curve 82). It will be noted that the cell of the invention has a much flatter curve and gives more volts over a considerably longer period before reaching the 0.9 volt cutoff point (after more than 90 hours).

EXAMPLE 10

The cells of Examples 10 through 15 utilize copper compounds as the depolarizer. The dry cell of Example 10 may be prepared according to Example 1 except that the cathode mix has the following formulation:

63 g. CuO
14 g. Cabot experimental Battery Black
2 g. $BaCrO_4$
48 ml. aqueous solution containing:
    250 g. $Mg(ClO_4)_2$ and
    1 g. $Li_2CrO_4.2H_2O$ per liter saturated with $Mg(OH)_2$ The bobbin weight is 8 grams.

EXAMPLE 11

The dry cell of Example 11 may be prepared according to Example 1 except that the cathode mix has the following formulation:

63 g. CuO
11.8 Cabot experimental Battery Black
2.2 g. Acheson graphite #615
2.5 g. $BaCrO_4$
48 ml. aqueous solution containing:
    250 g. $Mg(ClO_4)_2$ and
    1 g. $Li_2CrO_4.2H_2O$ per liter saturated with $Mg(OH)_2$ The bobbin weight is 9 grams.

EXAMPLE 12

The dry cell of Example 12 may be prepared according to Example 1 except that the cathode mix has the following formulation:

63 g. CuO
14 g. Shawinigan acetylene black
2 g. $BaCrO_4$
44 ml. aqueous solution containing:
    250 g. $Mg(ClO_4)_2$ and
    1 g. $Li_2CrO_4.2H_2O$ per liter saturated with $Mg(OH)_2$ The bobbin weight is 8 grams.

EXAMPLE 13

Another cell according to the invention may be prepared according to Example 1 except that the anode is a magnesium alloy identified as "AZ31X" (alloy No. 6a in Table II). The cathode mix formulation is as follows:

540 g. CuO
60 g. Cabot experimental Battery Black
18.0 g. $BaCrO_4$
220 ml. aqueous solution containing:
    250 g. $Mg(ClO_4)_2$ and
    1 g. $Li_2CrO_4.2H_2O$ per liter of water saturated with $Mg(OH)2$ The bobbin weight of this cell is 8 grams.

EXAMPLE 14

Another dry cell according to the invention may be prepared according to the cell of Example 1. The cathode mix formulation is as follows:

60 g. $Cu(OH)_2$
10 g. Cabot experimental Battery Black
3.0 g. $BaCrO_4$
38 ml. aqueous solution containing:
    250 g. $Mg(ClO_4)_2$ and
    1 g. $Li_2CrO_4.2H_2O$ per liter of water saturated with $Mg(OH)2$ The bobbin weight of this cell is 8 grams.

EXAMPLE 15

Another cell according to the invention may be prepared according to Example 1 except that the cathode mix has the following formulation:

100 g. $Cu_2O$
10 g. Cabot experimental Battery Black
3 g. $BaCrO_4$
49 ml. aqueous solution containing:
    250 g. $Mg(ClO_4)_2$ and
    1 g. $Li_2CrO_4.2H_2O$ per liter of water saturated with $Mg(OH)2$ The bobbin weight of this cell is 8 grams.

Referring now to FIGURE 8, characteristic discharge curves are shown for "AA" size dry cells of Examples 10 through 15 discharged continuously through a 50 ohm load resistance. Curve 83 is a summary curve for the copper-containing cells of Examples 10 through 15 inclusive, there being less than 10% variance between the discharge curves for all of these cells. For comparison, curve 82 shows the characteristic discharge of the well-known LeClanche cell, and curve 84 shows the characteristic discharge for the mercury cell, also described heretofore. It will be noted that the cells of Examples 10 through 15 exhibit high, flat voltage curves and also supply power for much longer periods to 0.8 volt cutoff than any of the prior art cells shown except the more expensive mercury cell.

Figure 9:
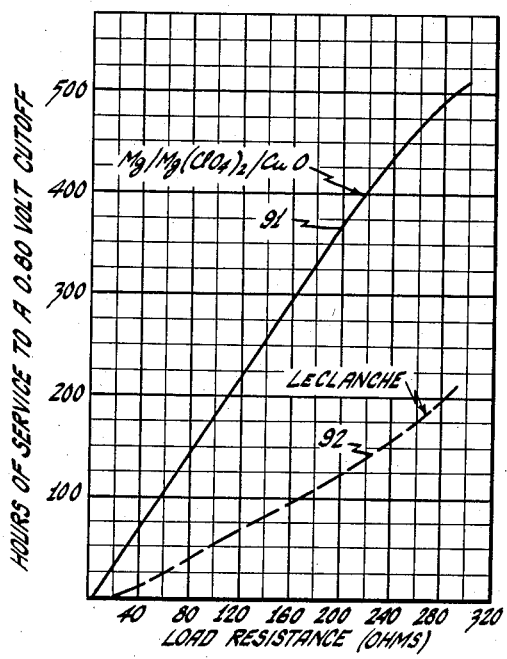
FIGURE 9 is a set of curves illustrating the hours of service delivered by the cells of Examples 10 through 15 for various load resistances, together with a curve for a comparable prior art cell.

In FIGURE 9 the copper-containing dry cells of Examples 10 through 16 inclusive are compared for hours of service to an 0.8 volt cutoff for various load resistances. Curve 91 shows the hours of service for the cells of Examples 10 to 16 and is a summary curve for these cells. Curve 92 shows the hours of service for the LeClanche cell. The cells of Examples 10 to 15 provide more hours of service over a wide range of loads than the LeClanche cells of curve 92.

Figure 10:
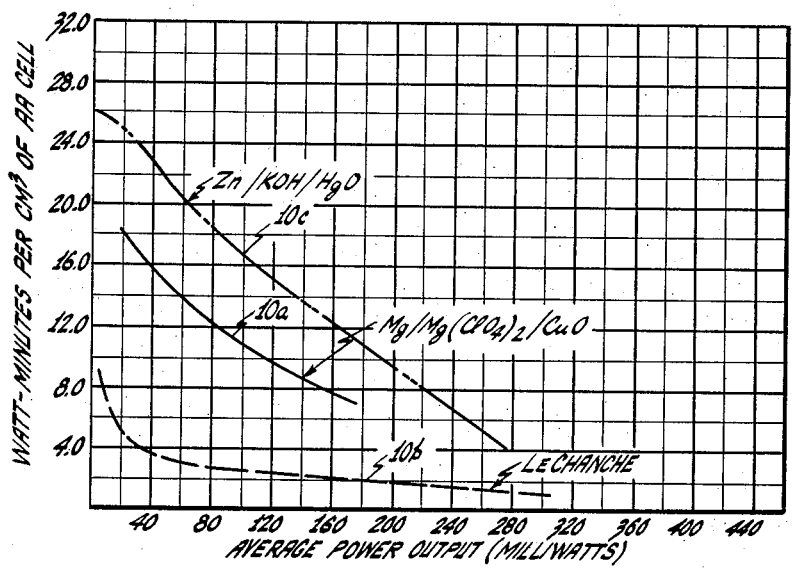
FIGURE 10 is a set of curves illustrating the watt-minutes per cubic centimeter at various power outputs for the cells of Examples 10 through 15, together with curves for comparable prior art cells.

Referring now to FIGURE 10, the dry cells of Examples 10 through 15 are compared for watt-minutes per cubic centimeter to 0.8 volt cutoff for various power outputs. Summary curve 10a shows the watt-minutes per cc. for the cells of Examples 10 to 16. Curves 10b and 10c show, respectively, the watt-minutes per cc. for the LeClanche cell and the mercury cell, all described previously. The dry cells of Examples 10 to 15 provide more power per unit volume over a wide range than the prior art cells with the exception of the mercury cell.

Figure 11:
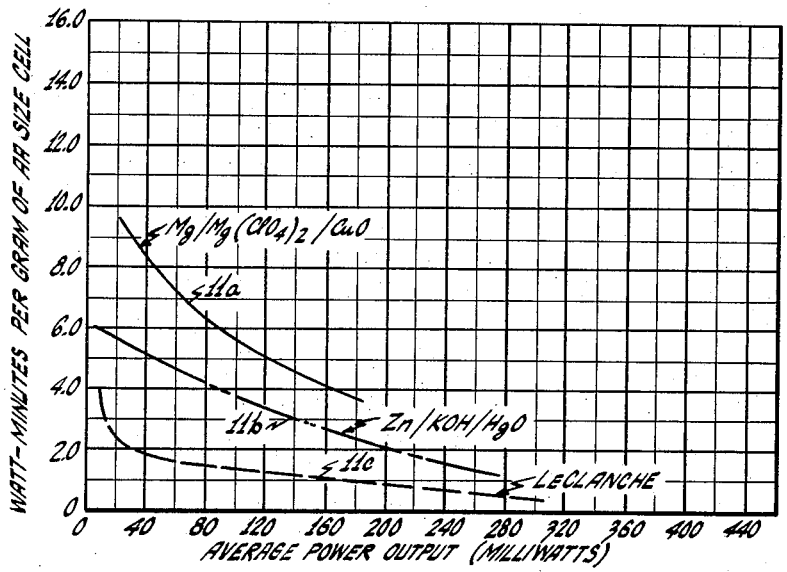
FIGURE 11 is a set of curves showing the watt-minutes per gram at various power outputs for the cells of Examples 10 through 15, together with curves for comparable prior art cells.

In FIGURE 11, the cells of Examples 10 through 15 are compared with the prior art cells as to watt-minutes per gram of cell to 0.8 volt cutoff for various load resistance. Summary curve 11a shows the watt-minutes per gram for the cells of Examples 10 to 15. Curves 11b and 11c show, respectively, the watt-minutes per gram for the LeClanche cell and the mercury cell. The dry cells of Examples 10 through 15 provide more total power per unit weight over a wide range than any of the prior art cells referred to.

EXAMPLE 16

Another cell according to the invention may be prepared according to Example 1 except that the cathode mix has the following formulation:

602 g. HgO
43 g. Cabot experimental Battery Black
19.4 g. $BaCrO_4$
160 ml. aqueous solution containing:
    250 g. $Mg(ClO_4)_2$ and
    1 g. $Li_2CrO_4.2H_2O$ per liter of water saturated with $Mg(OH)2$ The bobbin weight of this cell is 11.5 grams.

EXAMPLE 17

Another cell according to the invention may be prepared according to Example 1 except that the cathode mix has the following formulation:

96 g. HgO
8 g. Cabot experimental Battery Black
3.3 g. $BaCrO_4$
30 ml. aqueous solution containing:
    250 g. $Mg(ClO_4)_2$ and
    1 g. $Li_2CrO_4.2H_2O$ per liter of water saturated with $Mg(OH)2$ The bobbin weight of this cell is 11.5 grams.

Referring now to FIGURE 2, characteristic discharge curves for "AA" size dry cells of Examples 16 and 17 discharge continuously through a 150 ohm load resistance are shown. Curve 24 is a summary curve for the cells of Examples 16 and 17, there being less than 10% variance between the discharge curves for these cells. The cells of these examples exhibit high, relatively flatter voltage curves than the curves of the other cells shown on this figure. The cells of Examples 16 and 17 also provide power for much longer periods (approximately 185 hours) to 0.9 volt cutoff.

Referring now to FIGURE 4, the watt-minutes per cubic centimeter to 0.9 volt cutoff are shown in curve 46 for the cells of Examples 16 and 17. Curve 46 is a summary curve for the cells of these examples, there being less than 10% variance between them, and shows that more power per unit volume over a wide range of current is provided by these cells than any of the other cells shown.

In FIGURE 5, the capacity in watt-minutes per gram to 0.9 volt cutoff are shown in curve 56 for the cells of Examples 16 and 17. Curve 56 is likewise a summary curve for these cells and shows that more total power per unit weight over a wide range is provided by these cells than any of the other cells shown.

EXAMPLE 18

Another dry cell according to the invention may be prepared according to Example 1 except that the cathode mix has the following formulation:

120 g. $PbO_2$
10 g. Cabot experimental Battery Black
3.3 g. $BaCrO_4$
40 ml. aqueous solution containing:
    250 g. $Mg(ClO_4)_2$ and
    1 g. $Li_2CrO_4.2H_2O$ per liter of water saturated with $Mg(OH)_2$ The bobbin weight of this cell is 11 grams. The characteristic discharge curve for the "AA" size cell of this example, discharged continuously through a 50 ohm load resistance is shown by curve 85 in FIGURE 8. This cell does not reach the 0.9 volt cutoff until after approximately 32 hours.

EXAMPLE 19

Figure 12:
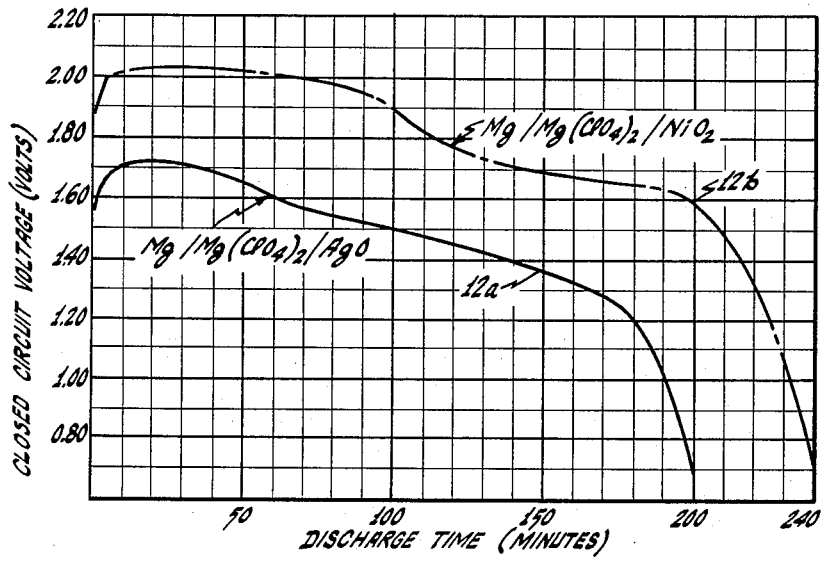
FIGURE 12 is a set of curves showing the change in cell voltage with respect to discharge time of Examples 19 and 20 of reserve cells of the invention discharged continuously through a 10 ohm load.

A reserve cell according to the invention may be prepared by formulating the following cathode mix:

10 g. AgO
40 ml. solution containing 5% by weight of cellulose acetate in acetone Paste a quantity of cathode mix to a silver plate (or any other electrically conductive member which will not react with silver oxide). The pasted plate is about $1\frac{5}{16}''$ x $1\frac{3}{4}''$ x $\frac{3}{64}''$ thick and weighs about 3 grams, of which about 2 grams are silver oxide. The cathode is dried and then wrapped with a piece of salt free kraft paper and then wrapped with a magnesium sheet about 3" x 1" x 0.010" thick and weighing about 1 gram. When ready to be used as a primary cell, the assembly is immersed in an aqueous solution containing 250 grams $Mg(ClO_4)_2$ per liter of water. The capacity of the cell with this cathode is approximately 0.45 ampere hour. The characteristic discharge at 10 ohms load is shown in FIGURE 12 by curve 12a.

EXAMPLE 20

A reserve cell according to the invention may be prepared by formulating the following cathode mix:

10 g. $NiO_2$
40 ml. solution containing 5% by weight of cellulose acetate in acetone Paste a quantity of cathode mix to a nickel plate (or any other electrically conductive member which will not react with nickel oxide). The pasted plate is about $1\frac{3}{4}''$ x $4\frac{1}{4}''$ x $\frac{3}{64}''$ thick and weighs about 6 grams, of which about 3 grams are nickel oxide. The cathode is dried and then wrapped with a piece of salt free kraft paper and then wrapped with a magnesium sheet about 9" x 1" x 0.010" thick and weighs about 3.0 grams. When ready to be used as a primary cell, the assembly is immersed in an aqueous solution containing 250 grams $Mg(ClO_4)_2$ per liter of water. The capacity of the cell with this cathode is approximately 0.45 ampere hour. The characteristic discharge at 10 ohms is shown in FIGURE 12 by curve 12b.

EXAMPLE 21

Another dry cell according to the invention may be prepared accoring to Example 1 except that a "D" size cup is used and the cathode mix has the following formulation:

300 g. meta-dinitrobenzene
150 g. Cabot experimental Battery Black
27 g. $BaCrO_4$
634 ml. aqueous solution containing:
　　250 g. $Mg(ClO_4)_2$ and
　　1 g. of $Li_2CrO_4.2H_2O$ per liter of water saturated with $Mg(OH)_2$ The bobbin weight of this "D" size cell is 30 grams.

EXAMPLE 22

Another dry cell according to the invention may be prepared according to Example 1 except that a "D" size cup is used and the cathode mix has the following formulation:

20 g. 3,5-dinitrobenzamide
20 g. Atlas Darco G-60 carbon
1.2 g. $BaCrO_4$
40 ml. aqueous solution containing:
　　250 g. $Mg(ClO_4)_2$ and
　　1 g. $Li_2CrO_4.2H_2O$ per liter of water saturated with $Mg(OH)_2$ The bobbin weight of this "D" size cell is 30 grams.

EXAMPLE 23

Another dry cell according to the invention may be prepared according to Example 1 except that a "D" size cup is used and the cathode mix has the following formulation:

300 g. 2,4-dinitrotoluene
150 g. Shawinigan acetylene black
27 g. $BaCrO_4$
674 ml. aqueous solution containing:
　　250 g. $Mg(ClO_4)_2$ and
　　1 g. $Li_2CrO_4.2H_2O$ per liter of water saturated with $Mg(OH)_2$ The bobbin weight of this "D" size cell is 30 grams.

EXAMPLE 24

Another dry cell according to the invention may be prepared according to Example 1 except that a "D" size cup is used and the cathode mix has the following formulation:

200 g. chloro-2,4-dinitrobenzene
200 g. Atlas Darco G-60 carbon
27 g. $BaCrO_4$
400 ml. aqueous solution containing:
　　250 g. $Mg(ClO_4)_2$ and
　　1 g. $Li_2CrO_4.2H_2O$ per liter of water saturated with $Mg(OH)_2$ The bobbin weight of this "D" size cell is 30 grams.

EXAMPLE 25

Another dry cell according to the invention may be prepared according to Example 1 except that a "D" size cup is used and the cathode mix has the following formulation:

300 g. para-nitrosodimethylaniline
150 g. Cabot experimental Battery Black
27 g. $BaCrO_4$
720 ml. aqueous solution containing:
　　250 g. $Mg(ClO_4)_2$ and
　　1 g. $Li_2CrO_4.2H_2O$ per liter of water saturated with $Mg(OH)_2$ The bobbin weight of this "D" size cell is 30 grams.

Figure 13:
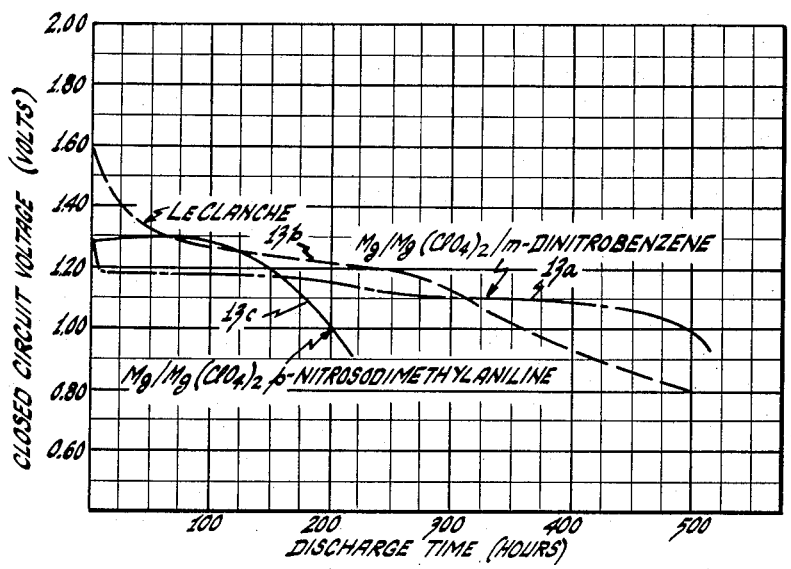
FIGURE 13 is a set of curves showing the change in cell voltage with respect to discharge time of Examples 21 to 25 of "D" size dry cells of the invention discharged continuously through an 83.3 ohm load, together with a curve for a comparable prior art cell.

Referring now to FIGURE 13, characteristic discharge curves for Examples 21 to 25 of "D" size dry cells discharged continuously through an 83.33 ohm load resistance are shown. Curve 13a is a summary curve for the cells of Examples 21 through 25, inclusive, there being less than 10% variance between the discharge curves for all five of these cells. It will be noted that the cells of these examples exhibit relatively higher voltage curves than the curve 13b for the well-known LeClanche cell ("D" size) shown in this figure. In the cells according to the invention the 0.9 volt cutoff is not reached until after 500 hours of operation.

Figure 14:
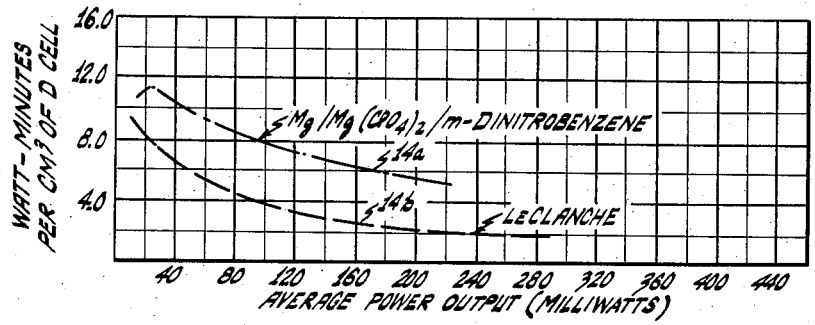
FIGURE 14 is a set of curves showing the capacity in watt-minutes per cubic centimeter at various power outputs for the "D" size cells of Examples 21 through 24, together with a curve for a comparable prior art dry cell.

Referring now to FIGURE 14, the dry cells of Examples 21 through 24, which all contain nitro compounds, are compared for capacity in watt-minutes per cubic cm. to a 0.9 volt cutoff for various power outputs. Summary curve 14a shows the watt-minutes per cc. for the cells of Examples 21 to 24. Curve 14b shows the watt-minutes per cc. for the LeClanche cell described previously. The dry cells of Examples 21 through 24 provide more power for unit volume over a wide range than the LeClanche cell.

In FIGURE 15, the cells of Examples 21 through 24 are compared with the prior art cells as to capacity in watt-minutes per gram to an 0.9 volt cutoff for various load resistances. Summary curve 15a shows the watt-minutes per gram for the cells of Examples 21 through 24. Curve 15b shows, for comparison, the watt-minutes per gram for the LeClanche cell. The dry cells of Examples 21 through 24 provide more total power per unit weight over a wide range of load than any of the prior art cells described.

EXAMPLE 26

Another reserve cell according to the invention may be prepared according to Example 19 except that the cathode mix has the following formulation:

20 g. N,N'-dichlorodimethylhydantoin
10 g. Shawinigan acetylene black

The electrolyte added before use is:

40 ml aqueous solution containing: 500 g.
per liter

The bobbin weight of this cell is 15 grams.

EXAMPLE 27

Another reserve cell according to the invention may be prepared according to Example 19 except that the cathode mix has the following formulation:

20 g. hexachloromelamine
10 g. shawinigan acetylene black

The electrolyte added before use is:

50 ml. aqueous solution containing: 400 g.
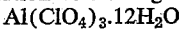
per liter

The bobbin weight of this cell is 15 grams.

EXAMPLE 28

Another reserve cell according to the invention may be prepared according to Example 19 except that the cathode mix has the following formulation:

20 g. azodicarbonamide
10 g. shawinigan Acetylene Black

The electrolyte added just before use is:

40 ml. aqueous solution containing: 500 g.
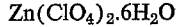
per liter

The bobbin weight of this cell is 15 grams.

Referring to FIGURE 16, characteristic discharge curves for the reserve cells of Examples 26 to 28 through a 4 ohm load are shown. Curve 16a shows the discharge of the reserve cell of Example 26. Curve 16b is the discharge curve of the reserve cell of Example 27. Curve 16c shows the characteristic discharge of the reserve cell of Example 28. It will be noted that even through this relatively heavy drain, these cells provided more than 1.30 volts for over three hours.

There has thus been described an improved electrochemical system which may be employed in primary cells. There have also been described improved primary cells, both dry and reserve, which are inexpensive to manufacture, which exhibit a high energy capacity and a high rate of discharge per unit of volume and weight, and a relatively flat voltage operating level over a wide range of current drains.

What is claimed is:

1. In a primary cell, an anode selected from the group consisting of magnesium and magnesium base alloys in combination with an electrolyte consisting essentially of water as the solvent, and a solute consisting essentially of water-soluble perchlorates, said perchlorates being selected from the group consisting of the alkali metals, the alkaline earth metals, aluminum, manganese, and zinc.

2. In a primary cell, a magnesium base alloy anode in combination with an electrolyte consisting essentially of an aqueous solution of water-soluble perchlorates, said perchlorates being selected from the class consisting of the alkali metals, the alkaline earth metals, aluminum, manganese, and zinc.

3. In a primary cell, a magnesium anode in combination with an electrolyte consisting essentially of an aqueous solution of magnesium perchlorate.

4. A primary cell comprising an anode selected from the group consisting of magnesium and magnesium base alloys, an electrolyte, and a cathode including a depolarizer; said electrolyte consisting essentially of an aqueous solution of a solute selected from the water-soluble perchlorates, said perchlorates being selected from the class consisting of the alkali metals, the alkaline earth metals, aluminum, manganese, and zinc; said cathode being selected from the class consisting of organic oxidizing agents and inorganic oxidizing agents; said organic agents consisting of those in which the oxidizing properties are due at least in part to a chemically combined group selected from the nitro groups, nitroso groups, N-halogen, and azo groups; said inorganic oxidizing agents being selected from the group consisting of copper hydroxide and the oxides of bismuth, manganese, lead, silver, nickel, mercury, and copper.

5. A primary cell comprising an anode selected from the group consisting of magnesium and magnesium base alloys, an electrolyte, and a cathode including a depolarizer; said electrolyte consisting essentially of an aqueous solution of water-soluble perchlorates, said perchlorates being selected from the class consisting of the alkali metals, the alkaline earth metals, aluminum, manganese, and zinc; said cathode being selected from the class consisting of organic oxidizing agents in which the oxidizing properties are due at least in part to a chemically combined nitro group.

6. A primary cell comprising a magnesium anode, an electrolyte, and a cathode including a depolarizer; said electrolyte consisting essentially of an aqueous solution of water-soluble perchlorates and mixtures of water-soluble perchlorates, said perchlorates being selected from those of the alkali metals, the alkaline earth metals, aluminum, manganese, and zinc; said cathode being selected from the group of organic oxidizing agents in which the oxidizing properties are due at least in part to a chemically combined nitroso group.

7. A primary cell comprising a magnesium anode, an electrolyte, and a cathode including a depolarizer; said electrolyte consisting essentially of an aqueous solution of water-soluble perchlorates, said perchlorates being selected from the class consisting of the alkali metals, the alkaline earth metals, aluminum, manganese, and zinc; said cathode being selected from the group of organic oxidizing agents in which the oxidizing properties are due at least in part to a chemically combined N-halogen group.

8. A primary cell comprising a magnesium anode, an electrolyte, and a cathode including a depolarizer; said electrolyte consisting essentially of an aqueous solution of water-soluble perchlorates, said perchlorates being selected from the class consisting of the alkali metals, the alkaline earth metals, aluminum, manganese, and zinc; said cathode being selected from the class consisting of organic oxidizing agents in which the oxidizing properties are due at least in part to a chemically combined azo group.

9. A primary cell comprising an anode selected from the group consisting of magnesium and magnesium base alloys, an electrolyte, and a cathode including a depolarizer; said electrolyte consisting essentially of an aqueous solution of water-soluble perchlorates, said perchlorates being selected from the class consisting of the alkali metals, the alkaline earth metals, aluminum, manganese, and zinc; said cathode being selected from the class consisting of inorganic oxidizing agents consisting of copper hydroxide and the oxides of bismuth, manganese, lead, silver, nickel, mercury, and copper.

10. A primary cell comprising an anode selected from the group consisting of magnesium and magnesium base alloys, an electrolyte and a cathode; said electrolyte consisting essentially of an aqueous solution of water-soluble perchlorates, said perchlorates being selected from the class consisting of the alkali metals, the alkaline earth metals, aluminum, manganese, and zinc; said cathode including manganese dioxide.

11. A primary cell comprising an anode selected from the group consisting of magnesium and magnesium base alloys, an electrolyte, and a cathode including a depolarizer; said electrolyte consisting essentially of an aqueous solution of magnesium perchlorate; said cathode being selected from the group consisting of organic oxidizing agents and inorganic oxidizing agents; said organic agents consisting of those in which the oxidizing properties are due at least in part to a chemically combined group selected from the class consisting of nitro groups, nitroso groups, N-halogen, and azo groups; said inorganic oxidizing agents being selected from the group consisting of copper hydroxide and the oxides of bismuth, manganese, lead, silver, nickel, mercury, and copper.

12. A primary cell comprising a magnesium anode, an electrolyte, and a cathode including a depolarizer; said electrolyte consisting essentially of an aqueous solution of magnesium perchlorate; said cathode being an organic oxidizing agent in which the oxidizing properties are due at least in part to a chemically combined nitro group.

13. A primary cell comprising a magnesium anode, an electrolyte, and a cathode including a depolarizer; said electrolyte consisting essentially of an aqueous solution of magnesium perchlorate; said cathode being an organic oxidizing agent in which the oxidizing properties are due at least in part to a chemically combined nitroso group.

14. A primary cell comprising a magnesium anode, an electrolyte, and a cathode including a depolarizer; said electrolyte consisting essentially of an aqueous solution of magnesium perchlorate; said cathode being an organic oxidizing agent in which the oxidizing properties are due at least in part to a chemically combined N-halogen group.

15. A primary cell comprising a magnesium anode, an electrolyte, and a cathode including a depolarizer; said electrolyte consisting essentially of an aqueous solution of magnesium perchlorate; said cathode being an organic oxidizing agent in which the oxidizing properties are due at least in part to a chemically combined azo group.

16. A primary cell comprising an anode selected from the group consisting of magnesium and magnesium base alloys, an electrolyte, and a cathode including a depolarizer; said electrolyte consisting essentially of an aqueous solution of magnesium perchlorate; said cathode being selected from the group of inorganic oxidizing agents consisting of copper hydroxide and the oxides of bismuth, manganese, lead, silver, nickel, mercury, and copper.

17. A primary cell comprising an anode selected from the group consisting of magnesium and magnesium base alloys, an electrolyte, and a cathode including a depolarizer; said electrolyte consisting essentially of an aqueous solution of magnesium perchlorate; said cathode including manganese dioxide.

18. A primary cell including an anode selected from the group consisting of magnesium and magnesium base alloys, an electrolyte, and a cathode including a depolarizer; said electrolyte consisting essentially of an aqueous solution of magnesium perchlorate containing a chromate inhibitor; said cathode being selected from the group of organic oxidizing agents and inorganic oxidizing agents; said organic agents consisting of those in which the oxidizing properties are due at least in part to a chemically combined group selected from the class consisting of nitro groups, nitroso groups, N-halogen, and azo groups; said inorganic oxidizing agents being selected from the group consisting of copper hydroxide and the oxides of bismuth, manganese, lead, silver, nickel, mercury, and copper.

19. A primary cell including a magnesium anode, an electrolyte, and a cathode including a depolarizer; said electrolyte consisting essentially of an aqueous solution of magnesium perchlorate containing a chromate inhibitor; said cathode being an organic oxidizing agent in which the oxidizing properties are due at least in part to a chemically combined nitro group.

20. A primary cell including a magnesium anode, an electrolyte, and a cathode including a depolarizer; said electrolyte consisting essentially of an aqueous solution of magnesium perchlorate containing a chromate inhibitor; said cathode being an organic oxidizing agent in which the oxidizing properties are due at least in part to a chemically combined nitroso group.

21. A primary cell including a magnesium anode, an electrolyte, and a cathode including a depolarizer; said electrolyte consisting essentially of an aqueous solution of magnesium perchlorate containing a chromate inhibitor; said cathode being an organic oxidizing agent in which the oxidizing properties are due at least in part to a chemically combined N-halogen group.

22. A primary cell including a magnesium anode, an electrolyte, and a cathode including a depolarizer; said electrolyte consisting essentially of an aqueous solution of magnesium perchlorate containing a chromate inhibitor; said cathode being an organic oxidizing agent in which the oxidizing properties are due at least in part to a chemically combined azo group.

23. A primary cell including an anode selected from the group consisting of magnesium and magnesium base alloys, an electrolyte, and a cathode including a depolarizer; said electrolyte consisting essentially of an aqueous solution of magnesium perchlorate containing a chromate inhibitor; said cathode being selected from the group of inorganic oxidizing agents consisting of copper hydroxide and the oxides of bismuth, manganese, lead, silver, nickel, mercury, and copper.

24. A primary cell including an anode selected from the group consisting of magnesium and magnesium base alloys, an electrolyte, and a cathode including a depolarizer; said electrolyte consisting essentially of an aqueous solution of magnesium perchlorate containing a chromate inhibitor; said cathode including manganese dioxide.

25. A primary cell including an anode selected from the group consisting of magnesium and magnesium base alloys, an electrolyte consisting essentially of an aqueous solution of barium perchlorate, and a cathode of manganese dioxide.

26. A primary cell including an anode selected from the group consisting of magnesium and magnesium base alloys, an electrolyte consisting essentially of an aqueous solution of strontium perchlorate and calcium perchlorate, and a cathode of manganese dioxide.

27. A primary cell including an anode selected from the group consisting of magnesium and magnesium base alloys, an electrolyte consisting essentially of an aqueous solution of lithium perchlorate, and a cathode of manganese dioxide.

28. A dry cell including a magnesium anode, an electrolyte consisting essentially of an aqueous solution of magnesium perchlorate, and a cathode of mercuric oxide.

29. A reserve cell including a magnesium anode, an electrolyte consisting essentially of an aqueous solution of magnesium perchlorate, and a cathode of silver oxide.

30. A reserve cell adapted to be used as a primary cell upon the addition of an electrolyte consisting essentially of an aqueous solution of magnesium perchlorate, said reserve cell comprising a magnesium anode and a cathode including nickel oxide.

31. A primary cell including a magnesium anode, an electrolyte consisting essentially of an aqueous solution of magnesium perchlorate, and a cathode including metadinitrobenzene.

32. A primary cell including a magnesium anode, an electrolyte consisting essentially of an aqueous solution of magnesium perchlorate, and a cathode including 3.5-dinitrobenzamide.

33. A primary cell including a magnesium anode, an electrolyte consisting essentially of an aqueous solution of magnesium perchlorate, and a cathode including para-nitrosodimethylaniline.

34. A reserve cell including a magnesium anode, an electrolyte consisting essentially of an aqueous solution of manganese perchlorate, and a cathode including N,N'-dichlorodimethylhydantoin.

35. A reserve cell including a magnesium anode, an electrolyte consisting essentially of an aqueous solution of aluminum perchlorate, and a cathode including hexachloromelamine.

36. A reserve cell including a magnesium anode, an electrolyte consisting essentially of an aqueous solution of zinc perchlorate, and a cathode including azodicarbonamide.

References Cited in the file of this patent
UNITED STATES PATENTS

| | | |
|---|---|---|
| 2,492,206 | White et al. | Dec. 27, 1949 |
| 2,597,451 | Coleman et al. | May 20, 1952 |
| 2,597,452 | Coleman et al. | May 20, 1952 |
| 2,597,453 | Coleman et al. | May 20, 1952 |
| 2,597,454 | Coleman et al. | May 20, 1952 |
| 2,612,535 | Blake | Sept. 30, 1952 |
| 2,612,537 | Blake | Sept. 30, 1952 |
| 2,616,940 | Reid | Nov. 4, 1952 |
| 2,621,220 | Kirk et al. | Dec. 9, 1952 |

OTHER REFERENCES

Lange, N. A.: "Handbook of Chemistry," Handbook Publishers, Sandusky, Ohio, 1949, Ed. 7, page 1268.